United States Patent
Degenhardt et al.

(10) Patent No.: US 11,109,592 B2
(45) Date of Patent: Sep. 7, 2021

(54) SELECTIVE WEED CONTROL METHODS

(71) Applicants: Rory Degenhardt, Edmonton (CA); Len Juras, Saskatoon (CA); Bill McGregor, Beaumont (CA); Peter Nott, Bendigo (AU); Norbert M. Satchivi, Carmel, IN (US); Monte R. Weimer, Pittsboro, IN (US)

(72) Inventors: Rory Degenhardt, Edmonton (CA); Len Juras, Saskatoon (CA); Bill McGregor, Beaumont (CA); Peter Nott, Bendigo (AU); Norbert M. Satchivi, Carmel, IN (US); Monte R. Weimer, Pittsboro, IN (US)

(73) Assignee: Corteva Agriscience LLC, Indianapolis, IN (US)

( * ) Notice: Subject to any disclaimer, the term of this patent is extended or adjusted under 35 U.S.C. 154(b) by 202 days.

(21) Appl. No.: 14/162,902

(22) Filed: Jan. 24, 2014

(65) Prior Publication Data
US 2014/0213456 A1    Jul. 31, 2014

Related U.S. Application Data

(60) Provisional application No. 61/756,920, filed on Jan. 25, 2013.

(51) Int. Cl.
*A01N 43/40* (2006.01)

(52) U.S. Cl.
CPC .................................. *A01N 43/40* (2013.01)

(58) Field of Classification Search
CPC ...................................................... A01N 43/40
See application file for complete search history.

(56) References Cited

U.S. PATENT DOCUMENTS

| | | | |
|---|---|---|---|
| 7,314,849 B2 | 1/2008 | Balko et al. | |
| 8,536,331 B2 | 9/2013 | Eckelbarger et al. | |
| 8,598,084 B2 | 12/2013 | Satchivi et al. | |
| 8,673,817 B2 | 3/2014 | Satchivi et al. | |
| 2009/0062121 A1* | 3/2009 | Satchivi et al. | 504/105 |
| 2011/0207606 A1* | 8/2011 | Satchivi | A01N 43/40 504/105 |

FOREIGN PATENT DOCUMENTS

WO    WO 2009/153247 A2  *  12/2009

OTHER PUBLICATIONS

Brassica (obtained online from Wikipedia, the free encyclopedia, see p. 3-4, obtained on Aug. 1, 2015).*
Sorghum (obtained online from Wikipedia, the free encyclopedia, obtained on Aug. 1, 2015).*

* cited by examiner

*Primary Examiner* — Abigail Vanhorn
*Assistant Examiner* — Mei Ping Chui

(57) ABSTRACT

4-Amino-3-chloro-6-(4-chloro-2-fluoro-3-methoxyphenyl) pyridine-2-carboxylic acid and agriculturally acceptable esters or salts thereof are used in methods for selective post-emergent control of undesirable vegetation in the presence of sunflowers, *sorghum*, yellow mustard, spring *Juncea* canola, spring kale, spring turnip, spring rutabaga, spring Winfred forage *brassica*, or sugar beet.

12 Claims, No Drawings

SELECTIVE WEED CONTROL METHODS

CROSS REFERENCE TO RELATED APPLICATIONS

This application claims the benefit of U.S. Provisional Patent Application Ser. No. 61/756,920 filed Jan. 25, 2013, the disclosure of which is expressly incorporated herein by reference.

BACKGROUND

Post-emergence weed control options in conventional sunflowers, *sorghum*, Brassicaceae-family crops, and sugar beet are severely limited, and products that are available generally have narrow weed spectra. There is therefore a need for new post-emergence herbicides to control undesirable vegetation in these crops.

Compounds of formula (I)

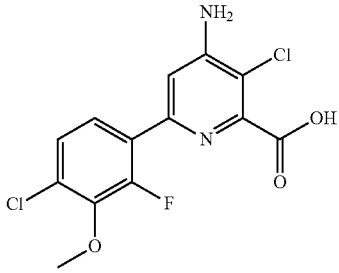

(I)

and agriculturally acceptable salts and esters thereof are described in U.S. Pat. No. 7,314,849 (B2), which is incorporated herein by reference in its entirety. As used herein, the term Compound I is used to refer to the compound of formula (I), i.e. 4-amino-3-chloro-6-(4-chloro-2-fluoro-3-methoxyphenyl)pyridine-2-carboxylic acid, and agriculturally acceptable salts and esters thereof.

Compound I is disclosed in U.S. Pat. No. 7,314,849 (B2) as belonging to a family of compounds with a broad spectrum of weed control activity against woody plants, broadleaf and grass weeds, and sedges. It is stated therein that the family of compounds can be used to control unwanted vegetation in crops such as corn, rice and cereals. Examples show the use of the methyl ester of the compound of formula (I) to control certain weeds in rice, barley, and wheat.

Compound I is highly active ($LD_{90}$ of ≤10 grams acid equivalent per hectare (g ae/ha)) on, for example, certain members of the Amaranthaceae (amaranths), Asteraceae (asters), Lamiaceae (mints), Rubiaceae (madders), Papaveraceae (Poppies) and Brassicaceae (mustards) families.

US2009/0062121A1 states that that Compound I is a preferred compound for the control of weeds in cereal crops including spring, winter and durum wheat, spring and winter barley, oats, and triticale.

U.S. Pat. No. 8,536,331 (B2) discloses a class of N-alkoxyamides of 6-(substituted phenyl)-4 aminopicolinates, including as specific examples certain N-alkoxyamide derivatives of the compound of formula (I), and states that they are superior herbicides with a broad spectrum of broadleaf weed control and with excellent selectivity to corn, canola and sugar beet. The carboxylic acids from which the alkoxyamides are derived are said (at paragraph [0014]) to be phytotoxic to corn, canola and sugar beet at commercially herbicidal doses.

U.S. Pat. No. 8,598,084 (B2) states that Compound I is used for the control of weeds in cereal crops, including spring, winter, and durum wheat, and spring and winter barley, and that the methyl ester of the compound of formula (I) controls annual grass weeds including *Setaria*, *Pennisetum*, and *Echinochloa*; broadleaf weeds such as *Papaver*, *Galium*, *Lamium*, *Kochia*, *Amaranthus*, *Aeschynomene*, *Sesbania*, and *Monochoria*, and sedge species such as *Cyperus* and *Scirpus*.

In view of the broad spectrum of activity of Compound I against broadleaf and grassy weeds, tolerance of *sorghum*, sunflowers, Brassicaceae-family crops, and sugar beets was not expected.

SUMMARY

Provided herein are methods for the selective post-emergent control of undesirable vegetation in the presence of sunflowers, *sorghum*, yellow mustard, spring *Juncea* canola, spring kale, spring turnip, spring rutabaga, spring Winfred forage *brassica*, or sugar beets which comprises applying a herbicidally effective amount of a compound of formula (I) or an agriculturally acceptable ester or salt thereof to the unwanted vegetation or the locus thereof.

At an application rate of 2.5 to 10 g ae/ha, Compound I is highly efficacious on several commercially relevant broadleaf weeds, including cleavers (*Galium aparine*), chickweed (*Stellaria media*), pigweed (*Amaranthus* spp.), hempnettle (*Galeopsis tetrahit*), lamb's-quarters (*Chenopodium album*), fumitory (*Fumaria* spp.), fleabane (*Erigeron* spp.), Mexican pricklepoppy (*Argemone mexicana*), geranium species (*Geranium* spp.), ragweed (*Ambrosia* spp.), stork's-bill (*Erodium cicutarium*), mallow (*Malva* spp.), volunteer flax (*Linum usitatissimum*), volunteer alfalfa (*Medicago sativa*) and deadnettle (*Lamium* spp.). The level of crop safety exhibited by sunflowers, *sorghum*, yellow mustard, Brassicaceae-family crops, and sugar beets toward Compound I is variable, but generally post-emergence application rates of ≤10 g ae/ha cause little to no crop injury, and in many cases, may be within commercially acceptable thresholds.

DETAILED DESCRIPTION

Definitions

The following terms have the indicated meanings when used herein:

As used herein, a herbicidally effective amount is an amount of active ingredient which causes an adversely modifying effect in targeted vegetation. Such effects include deviations from natural development, killing, regulation, desiccation, retardation, and the like.

As used herein, selective post-emergent control of undesirable vegetation means preventing, reducing, killing, or otherwise adversely modifying the development of the undesirable vegetation in the presence of crop plants with limited adverse effect on the crop plants. For example, a broadleaf weed control of 80% (rated visually) with crop injury of less than or equal to 20%, rated visually, would constitute selective control. In some embodiments the adverse effect on crop plants is limited to less than 10% visually rated crop injury. Visual crop injury is a composite rating accounting for all phytotoxic effects including chlorosis, growth inhibition, epinasty, delays in maturity and seed head deformity.

Visual weed control is a composite rating accounting for reductions in pest plant biomass and/or stand reduction.

As used herein, applying a herbicide or herbicidal composition means delivering it directly to the targeted vegetation or to the locus thereof or to the area where control of undesired vegetation is desired. Methods of application include, but are not limited to applications to the vegetation or locus thereof, e.g., application to the area adjacent to the vegetation, as well as pre-emergence, post-emergence, foliar, and in-water applications.

As used herein, plants and vegetation include, but are not limited to, germinant seeds, emerging seedlings, plants emerging from vegetative propagules, and established vegetation.

As used herein, agriculturally acceptable salts and esters of the compound of formula (I) refers to salts and esters that (a) do not substantially affect the herbicidal activity and (b) are or can by hydrolyzed, oxidized, metabolized, or otherwise converted in plants or solid to the corresponding carboxylic acid which, depending upon the pH, may be in the dissociated or undissociated form. Exemplary salts include those derived from alkali or alkaline earth metals and those derived from ammonia and amines. Exemplary cations include sodium, potassium, magnesium, and ammonium cations of the formula:

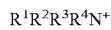

wherein $R^1$, $R^2$, $R^3$ and $R^4$ each, independently represents hydrogen or $C_1$-$C_{12}$ alkyl, $C_3$-$C_{12}$ alkenyl or $C_3$-$C_{12}$ alkynyl, each of which is optionally substituted by one or more hydroxy, $C_1$-$C_4$ alkoxy, $C_1$-$C_4$ alkylthio or phenyl groups, provided that $R^1$, $R^2$, $R^3$ and $R^4$ are sterically compatible. Additionally, any two of $R^1$, $R^2$, $R^3$ and $R^4$ together may represent an aliphatic difunctional moiety containing one to twelve carbon atoms and up to two oxygen or sulfur atoms. Salts can be prepared by treatment with a metal hydroxide, such as sodium hydroxide, with an amine, such as ammonia, trimethylamine, diethanolamine, 2-methylthiopropylamine, bisallylamine, 2-butoxyethylamine, morpholine, cyclododecylamine, or benzylamine or with a tetraalkylammonium hydroxide, such as tetramethylammonium hydroxide or choline hydroxide.

Exemplary esters include those derived from $C_1$-$C_{12}$ alkyl, $C_3$-$C_{12}$ alkenyl, $C_3$-$C_{12}$ alkynyl or $C_7$-$C_{10}$ aryl-substituted alkyl alcohols, such as methyl alcohol, isopropyl alcohol, 1-butanol, 2-ethylhexanol, butoxyethanol, methoxypropanol, allyl alcohol, propargyl alcohol, cyclohexanol or unsubstituted or substituted benzyl alcohols. Benzyl alcohols may be substituted with from 1-3 substituents independently selected from halogen, $C_1$-$C_4$ alkyl or $C_1$-$C_4$ alkoxy. Esters can be prepared by coupling of the acids with the alcohol using any number of suitable activating agents such as those used for peptide couplings such as dicyclohexylcarbodiimide (DCC) or carbonyl diimidazole (CDI); by reacting the acids with alkylating agents such as alkylhalides or alkylsulfonates in the presence of a base such as triethylamine or lithium carbonate; by reacting the corresponding acid chloride of an acid with an appropriate alcohol; by reacting the corresponding acid with an appropriate alcohol in the presence of an acid catalyst or by transesterification.

Specific examples of Compound I that were used in carrying out the examples set forth hereinafter are the methyl ester, the triethylammonium salt, and the potassium salt of the compound of formula (I).

Herbicidal activity is exhibited by the compounds when they are applied directly to the plant or to the locus of the plant at any stage of growth. The effect observed depends upon the plant species to be controlled, the stage of growth of the plant, the application parameters of dilution and spray drop size, the particle size of solid components, the environmental conditions at the time of use, the specific compound employed, the specific adjuvants and carriers employed, the soil type, and the like, as well as the amount of chemical applied. These and other factors can be adjusted to promote non-selective or selective herbicidal action. In some embodiments, the compositions described herein are applied as a post-emergence application, pre-emergence application, or in-water application to flooded paddy rice or water bodies (e.g., ponds, lakes and streams), to relatively immature undesirable vegetation to achieve the maximum control of weeds.

The mixtures described herein can be applied in conjunction with one or more other herbicides to control a wider variety of undesirable vegetation. When used in conjunction with other herbicides, the composition can be formulated with the other herbicide or herbicides, tank-mixed with the other herbicide or herbicides, or applied sequentially with the other herbicide or herbicides. Some of the herbicides that can be employed in conjunction with the compositions and methods described herein include, but are not limited to: 4-CPA, 4-CPB, 4-CPP, 2,4-D, 2,4-D choline salt, 2,4-D esters and amines, 2,4-DB, 3,4-DA, 3,4-DB, 2,4-DEB, 2,4-DEP, 3,4-DP, 2,3,6-TBA, 2,4,5-T, 2,4,5-TB, acetochlor, acifluorfen, aclonifen, acrolein, alachlor, allidochlor, alloxydim, allyl alcohol, alorac, ametridione, ametryn, amibuzin, amicarbazone, amidosulfuron, aminocyclopyrachlor, aminopyralid, amiprofos-methyl, amitrole, ammonium sulfamate, anilofos, anisuron, asulam, atraton, atrazine, azafenidin, azimsulfuron, aziprotryne, barban, BCPC, beflubutamid, benazolin, bencarbazone, benfluralin, benfuresate, bensulfuron-methyl, bensulide, benthiocarb, bentazon-sodium, benzadox, benzfendizone, benzipram, benzobicyclon, benzofenap, benzofluor, benzoylprop, benzthiazuron, bicyclopyrone, bifenox, bilanafos, bispyribac-sodium, borax, bromacil, bromobonil, bromobutide, bromofenoxim, bromoxynil, brompyrazon, butachlor, butafenacil, butamifos, butenachlor, buthidazole, buthiuron, butralin, butroxydim, buturon, butylate, cacodylic acid, cafenstrole, calcium chlorate, calcium cyanamide, cambendichlor, carbasulam, carbetamide, carboxazole, chlorprocarb, carfentrazone-ethyl, CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlornitrofen, chloropon, chlorotoluron, chloroxuron, chloroxynil, chlorpropham, chlorsulfuron, chlorthal, chlorthiamid, cinidon-ethyl, cinmethylin, cinosulfuron, cisanilide, clethodim, cliodinate, clodinafop-propargyl, clofop, clomazone, clomeprop, cloprop, cloproxydim, clopyralid, cloransulam-methyl, CMA, copper sulfate, CPMF, CPPC, credazine, cresol, cumyluron, cyanatryn, cyanazine, cycloate, cyclosulfamuron, cycloxydim, cycluron, cyhalofop-butyl, cyperquat, cyprazine, cyprazole, cypromid, daimuron, dalapon, dazomet, delachlor, desmedipham, desmetryn, di-allate, dicamba, dichlobenil, dichloralurea, dichlormate, dichlorprop, dichlorprop-P, diclofop-methyl, diclosulam, diethamquat, diethatyl, difenopenten, difenoxuron, difenzoquat, diflufenican, diflufenzopyr, dimefuron, dimepiperate, dimethachlor, dimethametryn, dimethenamid, dimethenamid-P, dimexano, dimidazon, dinitramine, dinofenate, dinoprop, dinosam, dinoseb, dinoterb, diphenamid, dipropetryn, diquat, disul, dithiopyr, diuron, DMPA, DNOC, DSMA, EBEP, eglinazine, endothal, epronaz, EPTC, erbon, esprocarb, ethalfluralin, ethbenzamide, ethametsulfuron, ethidimuron, ethiolate, ethobenzamid, etobenzamid, ethofumesate, ethoxyfen, ethoxysulfuron, etinofen, etnipromid, etobenzanid, EXD, fenasulam, fenoprop, fenoxaprop, fenoxaprop-P-ethyl, fenoxaprop-P-ethyl+isoxadifen-ethyl, fenoxasulfone, fenteracol, fenthiaprop, fentrazamide, fenuron, ferrous sulfate, flamprop, flamprop-M, flazasulfuron, florasulam, fluazifop, fluazifop-P-butyl, fluazolate, flucarbazone, flucetosulfuron, fluchloralin, flufenacet, flufenican, flufenpyr-ethyl, flumetsulam, flumezin, flumiclorac-pentyl, flumioxazin, flumipropyn, flumeturon, fluorodifen, fluoroglycofen, fluoromidine, fluoronitrofen, fluothiuron, flupoxam, flupropacil, flupropanate, flupyrsulfuron, fluridone, flurochloridone, fluroxypyr, flurtamone, fluthiacet, fomesafen, foramsulfuron, fosamine, fumiclorac, furyloxyfen, glufosinate, glufosinate-ammonium, glufosinate-P-ammonium, glyphosate, halosafen, halosulfuron-methyl, haloxydine, haloxyfop-methyl, haloxyfop-P-methyl, hexachloroacetone, hexaflurate, hexazinone, imazamethabenz, imazamox, imazapic, imazapyr, imazaquin, imazosulfuron, imazethapyr, indanofan, indaziflam, iodobonil, iodomethane, iodosulfuron, iodosulfuron-ethyl-sodium, iofensulfuron, ioxynil, ipazine, ipfencarbazone, iprymidam, isocarbamid, isocil, isomethiozin, isonoruron, isopolinate, isopropalin, isoproturon, isouron, isoxaben, isoxachlortole, isoxaflutole, isoxapyrifop, karbutilate, ketospiradox, lactofen, lenacil, linuron, MAA, MAMA, MCPA esters and amines, MCPA-thioethyl, MCPB, mecoprop, mecoprop-P, medinoterb, mefenacet, mefluidide, mesoprazine, mesosulfuron, mesotrione, metam, metamifop, metamitron, metazachlor, metazosulfuron, metflurazon, methabenzthiazuron, methalpropalin, methazole, methiobencarb, methiozolin, methiuron, methometon, methoprotryne, methyl bromide, methyl isothiocyanate, methyldymron, metobenzuron, metobromuron, metolachlor, metosulam, metoxuron, metribuzin, metsulfuron, metsulfuron-methyl, molinate, monalide, monisouron, monochloroacetic acid, monolinuron, monuron, morfamquat, MSMA, naproanilide, napropamide, napropamide-M, naptalam, neburon, nicosulfuron, nipyraclofen, nitralin, nitrofen, nitrofluorfen, norflurazon, noruron, OCH, orbencarb, ortho-dichlorobenzene, orthosulfamuron, oryzalin, oxadiargyl, oxadiazon, oxapyrazon, oxasulfuron, oxaziclomefone, oxyfluorfen, paraflufen-ethyl, parafluron, paraquat, pebulate, pelargonic acid, pendimethalin, penoxsulam, pentachlorophenol, pentanochlor, pentoxazone, perfluidone, pethoxamid, phenisopham, phenmedipham, phenmedipham-ethyl, phenobenzuron, phenylmercury acetate, picloram, picolinafen, pinoxaden, piperophos, potassium arsenite, potassium azide, potassium cyanate, pretilachlor, primisulfuron-methyl, procyazine, prodiamine, profluazol, profluralin, profoxydim, proglinazine, prohexadione-calcium, prometon, prometryn, pronamide, propachlor, propanil, propaquizafop, propazine, propham, propisochlor, propoxycarbazone, propyrisulfuron, propyzamide, prosulfalin, prosulfocarb, prosulfuron, proxan, prynachlor, pydanon, pyraclonil, pyraflufen-ethyl, pyrasulfotole, pyrazogyl, pyrazolynate, pyrazosulfuron-ethyl, pyrazoxyfen, pyribenzoxim, pyributicarb, pyriclor, pyridafol, pyridate, pyriftalid, pyriminobac, pyrimisulfan, pyrithiobac-sodium, pyroxasulfone, pyroxsulam, quinclorac, quinmerac, quinoclamine, quinonamid, quizalofop, quizalofop-P-ethyl, rhodethanil, rimsulfuron, saflufenacil, S-metolachlor, sebuthylazine, secbumeton, sethoxydim, siduron, simazine, simeton, simetryn, SMA, sodium arsenite, sodium azide, sodium chlorate, sulcotrione, sulfallate, sulfentrazone, sulfometuron, sulfosate, sulfosulfuron, sulfuric acid, sulglycapin, swep, TCA, tebutam, tebuthiuron, tefuryltrione, tembotrione, tepraloxydim, terbacil, terbucarb, terbuchlor, terbumeton, terbuthylazine, terbutryn, tetrafluron, thenylchlor, thiazafluron, thiazopyr, thidiazimin, thidiazuron, thiencarbazone-methyl, thifensulfuron, thifensulfuron-methyl, thiobencarb, tiocarbazil, tioclorim, topramezone, tralkoxydim, triafamone, tri-allate, triasulfuron, triaziflam, tribenuron, tribenuron-methyl, tricamba, triclopyr choline salt, triclopyr esters and salts, tridiphane, trietazine, trifloxysulfuron, trifluralin, triflusulfuron, trifop, trifopsime, trihydroxytriazine, trimeturon, tripropindan, tritac, tritosulfuron, vernolate, xylachlor and salts, esters, optically active isomers and mixtures thereof.

The compositions and methods described herein can, further, be used in conjunction with glyphosate, glufosinate, dicamba, phenoxy auxins, pyridyloxy auxins, aryloxyphenoxypropionates, acetyl CoA carboxylase (ACCase) inhibitors, imidazolinones, acetolactate synthase (ALS) inhibitors, 4-hydroxyphenyl-pyruvate dioxygenase (HPPD) inhibitors, protoporphyrinogen oxidase (PPO) inhibitors, triazines, and bromoxynil on glyphosate-tolerant, glufosinate-tolerant, dicamba-tolerant, phenoxy auxin-tolerant, pyridyloxy auxin-tolerant, aryloxyphenoxypropionate-tolerant, ACCase-tolerant, imidazolinone-tolerant, ALS-tolerant, HPPD-tolerant, PPO-tolerant, triazine-tolerant, bromoxynil-tolerant, and crops possessing multiple or stacked traits conferring tolerance to multiple chemistries and/or multiple modes-of-action. In some embodiments, the compound of formula (I) or salt or ester thereof and complementary herbicide or salt or ester thereof are used in combination with herbicides that are selective for the crop being treated and which complement the spectrum of weeds controlled by these compounds at the application rate employed. In some embodiments, the compositions described herein and other complementary herbicides are applied at the same time, either as a combination formulation or as a tank mix.

In some embodiments, the compositions described herein are employed in combination with one or more herbicide safeners, such as AD-67 (MON 4660), benoxacor, benthiocarb, brassinolide, cloquintocet (mexyl), cyometrinil, daimuron, dichlormid, dicyclonon, dimepiperate, disulfoton, fenchlorazole-ethyl, fenclorim, flurazole, fluxofenim, furilazole, harpin proteins, isoxadifen-ethyl, jiecaowan, jiecaoxi, mefenpyr-diethyl, mephenate, naphthalic anhydride (NA), oxabetrinil, R29148 and N-phenyl-sulfonylbenzoic acid amides, 1-[4-(N-(2-methoxybenzoyl)sulfamoyl)phenyl]-3-methylurea, N-(2-methoxybenzoyl)-4-[(methylaminocarbonyl)amino]benzenesulfonamide, to enhance their selectivity. In some embodiments, the safener is cloquintocet or an ester or salt thereof. In certain embodiments, cloquintocet is utilized to antagonize harmful effects of the compositions on rice and cereals. In some embodiments, the safener is cloquintocet (mexyl).

In some embodiments, compositions provided herein further comprise at least one agriculturally acceptable adjuvant or carrier. Suitable adjuvants or carriers should not be phytotoxic to valuable crops, particularly at the concentrations employed in applying the compositions for selective weed control in the presence of crops, and should not react chemically with herbicidal components or other composition ingredients. Such mixtures can be designed for application directly to weeds or their locus or can be concentrates or formulations that are normally diluted with additional carriers and adjuvants before application. They can be solids, such as, for example, dusts, granules, water-dispersible granules, or wettable powders, or liquids, such as, for example, emulsifiable concentrates, solutions, emulsions or suspensions. They can also be provided as a pre-mix or tank-mixed.

Suitable agricultural adjuvants and carriers include, but are not limited to, crop oil concentrate; nonylphenol ethoxylate; benzylcocoalkyldimethyl quaternary ammonium salt; blend of petroleum hydrocarbon, alkyl esters, organic acid, and anionic surfactant; $C_9$-$C_{11}$ alkylpolyglycoside; phosphated alcohol ethoxylate; natural primary alcohol ($C_{12}$-$C_{16}$) ethoxylate; di-sec-butylphenol EO-PO block copolymer; polysiloxane-methyl cap; nonylphenol ethoxylate+urea ammonium nitrate; emulsified methylated seed oil; tridecyl alcohol (synthetic) ethoxylate (8EO); tallow amine ethoxylate (15 EO); PEG(400) dioleate-99; paraffinic oil, alkoxylated alcohol non-ionic surfactant; mineral oil, surfactant blend.

Liquid carriers that can be employed include water and organic solvents. The organic solvents include, but are not limited to, petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like. Specific organic solvents include, but are not limited to toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, dimethyl sulfoxide, liquid fertilizers and the like. In certain embodiments, water is the carrier for the dilution of concentrates.

Suitable solid carriers include but are not limited to talc, pyro-phyllite clay, silica, attapulgus clay, kaolin clay, kieselguhr, chalk, diatomaceous earth, lime, calcium carbonate, bentonite clay, Fuller's earth, cottonseed hulls, wheat flour, soybean flour, pumice, wood flour, walnut shell flour, lignin, cellulose, and the like.

In some embodiments, the compositions described herein further comprise one or more surface-active agents. In some embodiments, such surface-active agents are employed in both solid and liquid compositions, and in certain embodiments those designed to be diluted with carrier before application. The surface-active agents can be anionic, cationic or nonionic in character and can be employed as emulsifying agents, wetting agents, suspending agents, or for other purposes. Surfactants which may also be used in the present formulations are described, inter alia, in "McCutcheon's Detergents and Emulsifiers Annual," MC Publishing Corp., Ridgewood, N.J., 1998 and in "Encyclopedia of Surfactants," Vol. I-III, Chemical Publishing Co., New York, 1980-81. Surface-active agents include, but are not limited to salts of alkyl sulfates, such as diethanolammonium lauryl sulfate; alkylarylsulfonate salts, such as calcium dodecylbenzenesulfonate; alkylphenol-alkylene oxide addition products, such as nonylphenol-$C_{18}$ ethoxylate; alcohol-alkylene oxide addition products, such as tridecyl alcohol-$C_{16}$ ethoxylate; soaps, such as sodium stearate; alkylnaphthalene-sulfonate salts, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; salts of mono and dialkyl phosphate esters; vegetable or seed oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, and in certain embodiments, methyl esters.

In some embodiments, these materials, such as vegetable or seed oils and their esters, can be used interchangeably as an agricultural adjuvant, as a liquid carrier or as a surface active agent.

Other exemplary additives for use in the compositions provided herein include but are not limited to compatibilizing agents, antifoam agents, sequestering agents, neutralizing agents and buffers, corrosion inhibitors, dyes, odorants, spreading agents, penetration aids, sticking agents, dispersing agents, thickening agents, freezing point depressants, antimicrobial agents, and the like. The compositions may also contain other compatible components, for example, other herbicides, plant growth regulants, fungicides, insecticides, and the like and can be formulated with liquid fertilizers or solid, particulate fertilizer carriers such as ammonium nitrate, urea and the like.

In some embodiments, the concentration of the active ingredients in the compositions described herein is from 0.0005 to 98 percent by weight. In some embodiments, the concentration is from 0.0006 to 90 percent by weight. In compositions designed to be employed as concentrates, the active ingredients, in certain embodiments, are present in a concentration from 0.1 to 98 weight percent, and in certain embodiments 0.5 to 90 weight percent. Such compositions are, in certain embodiments, diluted with an inert carrier, such as water, before application. The diluted compositions usually applied to weeds or the locus of weeds contain, in certain embodiments, 0.0006 to 3.0 weight percent active ingredient and in certain embodiments contain 0.01 to 0.3 weight percent.

The present compositions can be applied to weeds or their locus by the use of conventional ground or aerial dusters, sprayers, and granule applicators, by addition to irrigation water, and by other conventional means known to those skilled in the art.

The described embodiments and following examples are for illustrative purposes and are not intended to limit the scope of the claims. Other modifications, uses, or combinations with respect to the compositions described herein will be apparent to a person of ordinary skill in the art without departing from the spirit and scope of the claimed subject matter.

EXAMPLES

Field Trials:

Small plot research experiments were conducted in various geographies to evaluate the crop safety of sunflowers (*Helianthus annuus*), sorghum (*Sorghum vulgare*), yellow mustard (*Sinapis alba*), spring *Juncea* canola (*Brassica juncea*), spring kale (*Brassica oleracea*), spring turnip (*Brassica rapa*), spring rutabaga (*Brassica napus*), spring Winfred forage *brassica* (*Brassica rapa×oleracea*), and sugar beet (*Beta vulgaris* subsp. *vulgaris* var. *altissima*) to post-emergence application of Compound I. A minimum application water volume of 100 liters per hectare (L/ha) was used for all experiments. Crop staging at application ranged from cotyledon to mid-tillering stage (*sorghum*) or to the six-leaf stage (Brassicaceae-family crops). Generally, plants were at the two to six-leaf stage at the time of herbicide applications. In some instances, injury to target crops was assessed based on the level of control observed of volunteer plants in a cereal crop. Visual injury ratings were collected at rating intervals from 1 to 27+ weeks after treatment (WAT). Generally, injury ratings accounted for all phytotoxic effects, including chlorosis, growth inhibition, delay in maturity and reproductive abnormalities.

*Juncea* Canola (*Brassica Juncea*):

Data from five field trials suggest that *Juncea* canola exhibits a high level of tolerance to Compound I. On average, injury to *Juncea* canola did not exceed 7.5, 11.3 and 5.5% at Compound I rates of 2.5, 5 and 10 g ae/ha, respectively.

Data from the trials on spring *Juncea* canola (*Brassica juncea*) are summarized in Table 1. The methyl ester of the compound of formula (I) was tested at the indicated rates. Application was at the B12-B14 crop stage.

TABLE 1

Crop injury to *Juncea* canola (*Brassica juncea*) by the methyl ester of the compound of formula (I)

| Rate | Weeks after Application | Number of Observations | Percent (%) Crop Injury (Mean Value) |
|---|---|---|---|
| 2.5 | 1 | 4 | 2.5 |
| 2.5 | 3-5 | 8 | 7.5 |
| 2.5 | 6-10 | 4 | 5 |
| 5 | 1 | 4 | 3.8 |
| 5 | 3-5 | 20 | 10.5 |
| 5 | 6-10 | 8 | 11.3 |
| 10 | 1 | 4 | 3.8 |
| 10 | 3-5 | 11 | 5.5 |
| 10 | 6-10 | 8 | 3.8 |
| 20 | 1 | 4 | 30 |
| 20 | 3-5 | 8 | 13.8 |
| 20 | 6-10 | 4 | 0 |

Turnip (*Brassica Rapa*):

Data from three field trials suggest that turnip exhibits a high level of tolerance to Compound I. On average, injury to turnip did not exceed 2.5, 5 and 7.5% at Compound I rates of 2.5, 5 and 10 g ae/ha, respectively.

Data from the trials on spring turnip (*Brassica rapa*) are summarized in Table 2. The methyl ester of the compound of formula (I) was tested at the indicated rates. Application was at the B12-B16 crop stage.

TABLE 2

Crop injury to spring turnip (*Brassica rapa*) by the methyl ester of the compound of formula (I)

| Rate | Weeks after Application | Number of Observations | Percent (%) Crop Injury (Mean Value) |
|---|---|---|---|
| 2.5 | 1 | 4 | 2.5 |
| 2.5 | 3-5 | 4 | 2.5 |
| 5 | 1 | 4 | 5 |
| 5 | 3-5 | 12 | 1.3 |
| 10 | 1 | 4 | 7.5 |
| 10 | 3-5 | 4 | 7.5 |
| 20 | 1 | 4 | 17.5 |
| 20 | 3-5 | 4 | 7.5 |

Rutabaga (*Brassica Napus*):

Data from three field trials suggest that rutabaga exhibits a high level of tolerance to Compound I. On average, injury to rutabaga did not exceed 6.3, 10 and 15% at Compound I rates of 2.5, 5 and 10 g ae/ha, respectively.

Data from the trials on spring rutabaga (*Brassica napus*) are summarized in Table 3. The methyl ester of the compound of formula (I) was tested at the indicated rates. Application was at the B12-B14 crop stage.

TABLE 3

Crop injury to spring rutabaga (*Brassica napus*) by the methyl ester of the compound of formula (I)

| Rate | Weeks after Application | Number of Observations | Percent (%) Crop Injury (Mean Value) |
|---|---|---|---|
| 2.5 | 1 | 4 | 6.3 |
| 2.5 | 3-5 | 4 | 3.8 |
| 5 | 1 | 4 | 10 |
| 5 | 3-5 | 12 | 3.3 |
| 10 | 1 | 4 | 15 |
| 10 | 3-5 | 4 | 7.5 |
| 20 | 1 | 4 | 27.5 |
| 20 | 3-5 | 4 | 15 |

Kale (*Brassica Oleracea*):

Data from three field trials suggest that kale exhibits a high level of tolerance to Compound I. On average, injury to kale did not exceed 2.5, 1.3 and 3.8% at Compound I rates of 2.5, 5 and 10 g ae/ha, respectively.

Data from the trials on spring kale (*Brassica oleracea*) are summarized Table 4. 4-Amino-3-chloro-6-(4-chloro-2-fluoro-3-methoxyphenyl)pyridine-2-carboxylic acid methyl ester was tested at the indicated rates. Application was at the B12-B16 crop stage.

TABLE 4

Crop injury to spring kale (*Brassica oleracea*) by the methyl ester of the compound of formula (I)

| Rate | Weeks after Application | Number of Observations | Percent (%) Crop Injury (Mean Value) |
|---|---|---|---|
| 2.5 | 1 | 4 | 2.5 |
| 2.5 | 3-5 | 4 | 0 |
| 5 | 1 | 4 | 1.3 |
| 5 | 3-5 | 12 | 1.3 |
| 10 | 1 | 4 | 2.5 |
| 10 | 3-5 | 4 | 3.8 |
| 20 | 1 | 4 | 15 |
| 20 | 3-5 | 4 | 17.5 |

Winfred Forage *Brassica* (*Brassica Rapa×Oleracea*):

Data from three field trials conducted suggest that Winfred forage *brassica* exhibits a high level of tolerance to Compound I. On average, injury to Winfred forage *brassica* did not exceed 17.5, 9.2 and 8.8% at Compound I rates of 2.5, 5 and 10 g ae/ha, respectively.

Data from the trials in Australia on spring Winfred forage *brassica* (*Brassica rapa×oleracea*) are summarized in Table 5. 4-Amino-3-chloro-6-(4-chloro-2-fluoro-3-methoxyphenyl)pyridine-2-carboxylic acid methyl ester was tested at the indicated rates. Application was at the B14-B16 crop stage.

TABLE 5

Crop injury to Winfred forage *brassica* (*Brassica rapa* × *oleracea*) by the methyl ester of the compound of formula (I)

| Rate | Weeks after Application | Number of Observations | Percent (%) Crop Injury (Mean Value) |
|---|---|---|---|
| 2.5 | 3-5 | 4 | 17.5 |
| 2.5 | 6-10 | 4 | 7.5 |
| 5 | 3-5 | 12 | 9.2 |
| 5 | 6-10 | 8 | 7.5 |
| 10 | 3-5 | 8 | 8.8 |
| 10 | 6-10 | 8 | 0 |
| 20 | 3-5 | 4 | 11.3 |
| 20 | 6-10 | 4 | 12.5 |

Spring Sunflower (*Helianthus Annuus*)

Data from two field trials conducted in Australia suggest that sunflower exhibits a high level of tolerance to Compound I. On average, injury did not exceed 6.7, 13.3 and 15% at Compound I rates of 2.5, 5 and 10 g ae/ha, respectively. The TEA-salt of the compound of formula (I) may be slightly less active on sunflowers than the methyl ester. The data from trials in Australia on spring sunflower (*Helianthus annuus*) are summarized in Table 6. The methyl ester of the compound of formula (I) and the TEA salt of the compound of formula (I) were tested at the indicated rates. Application was at the B12-B14 crop stage.

TABLE 6

Crop injury to spring sunflower (*Helianthus annuus*) by the methyl ester and TEA salt of Compound I

| Rate | Active Ingredient | Weeks after Application | Number of Observations | Percent (%) Crop Injury (Mean Value) |
|---|---|---|---|---|
| 2.5 | Methyl ester | 3-5 | 3 | 6.7 |
| 2.5 | Methyl ester | 6-10 | 3 | 6.7 |
| 5 | Methyl ester | 3-5 | 3 | 13.3 |
| 5 | Methyl ester | 6-10 | 3 | 11.7 |
| 5 | TEA salt | 1 | 4 | 7.5 |
| 5 | TEA salt | 3-5 | 4 | 2.5 |
| 10 | Methyl ester | 3-5 | 3 | 15 |
| 10 | Methyl ester | 6-10 | 3 | 8.3 |
| 10 | TEA salt | 1 | 4 | 7.5 |
| 10 | TEA salt | 3-5 | 4 | 5 |
| 20 | Methyl ester | 3-5 | 3 | 22.3 |
| 20 | Methyl ester | 6-10 | 3 | 6.7 |
| 20 | TEA salt | 1 | 4 | 17.5 |
| 20 | TEA salt | 3-5 | 4 | 5 |

Sorghum (*Sorghum Vulgare*):

Data from two field trials suggest that *sorghum* exhibits a high level of tolerance to Compound I. On average, injury to *sorghum* did not exceed 13.3, 18.3 and 18.3% at Compound I rates of 2.5, 5 and 10 g ae/ha, respectively. The TEA-salt of the compound of formula (I) may be slightly less active on *sorghum* than the methyl ester. Data from the trials on spring *sorghum* (*Sorghum vulgare*) are summarized in Table 7. The methyl ester and TEA salt of the compound of formula (I) were tested at the indicated rates. Application was at the B17-B22 crop stage.

TABLE 7

Crop injury to spring *sorghum* (*Sorghum vulgare*) by the methyl ester and TEA salt of the compound of formula (I)

| Rate | Active Ingredient | Weeks after Application | Number of Observations | Percent (%) Crop Injury (Mean Value) |
|---|---|---|---|---|
| 2.5 | Methyl ester | 3-5 | 3 | 8.3 |
| 2.5 | Methyl ester | 6-10 | 3 | 13.3 |
| 5 | Methyl ester | 3-5 | 3 | 11.7 |
| 5 | Methyl ester | 6-10 | 3 | 18.3 |
| 5 | TEA salt | 1 | 8 | 8.1 |
| 5 | TEA salt | 3-5 | 8 | 0.6 |
| 10 | Methyl ester | 3-5 | 3 | 18.3 |
| 10 | Methyl ester | 6-10 | 3 | 15 |
| 10 | TEA salt | 1 | 8 | 10.6 |
| 10 | TEA salt | 3-5 | 8 | 3.1 |
| 20 | Methyl ester | 3-5 | 3 | 13.3 |
| 20 | Methyl ester | 6-10 | 3 | 15 |
| 20 | TEA salt | 1 | 8 | 14.4 |
| 20 | TEA salt | 3-5 | 8 | 12.5 |

Yellow Mustard (*Sinapis Alba*)

Data from one field trial suggests that yellow mustard exhibits a high level of tolerance to Compound I. On average, injury to yellow mustard did not exceed 8.5, 14.3, and 25% at Compound I rates of 2.5, 5, and 10 g ae/ha, respectively. Yield of yellow mustard, relative to untreated check treatment, was not impacted by application of Compound I at rates of 2.5 to 10 g ae/ha. The data are summarized in Table 8. The methyl ester of the compound of formula (I) was tested at the indicated rates. Application was at the B14-B15 crop stage.

TABLE 8

Crop injury to yellow mustard (*Sinapis alba*) by the methyl ester of the compound of formula (I)

| Rate | Weeks after Application | Percent (%) Crop Injury (Mean Value of Four Observations) |
|---|---|---|
| 2.5 | 1 | 8.5 |
| 2.5 | 2 | 4.8 |
| 2.5 | 3-5 | 4.5 |
| 5 | 1 | 14.3 |
| 5 | 2 | 10 |
| 5 | 3-5 | 7.5 |
| 10 | 1 | 21.3 |
| 10 | 2 | 25 |
| 10 | 3-5 | 16.3 |
| 20 | 1 | 23.8 |
| 20 | 2 | 35 |
| 20 | 3-5 | 25 |

Sugar Beet (*Beta Vulgaris* Subsp. *Vulgaris* Var. *Altissima*)

Data from five field trials conducted in Germany and Hungary suggest that sugar beet exhibits a considerable level of tolerance to Compound I. On average, growth inhibition to sugar beet did not exceed 3.8, 8.8, 7.5, and 12.5% at Compound I rates of 0.5, 1.0, 2.0, and 3.0 g ae/ha, respectively.

Table 9 reports crop safety and efficacy observations made 36 days following last application of the methyl ester of the compound of formula (I) at the indicated rates. Treatments 4 and 5 were split applications at the two indicated growth stages.

TABLE 9

Crop growth inhibition to sugar beet and target weed efficacy by the methyl ester of the compound of formula (I)

| Treatment number | Rate (g ae/ha) | Growth Stage of BEAVA at Time of Application | Percent (%) Visual Growth Inhibition BEAVA | Percent (%) Visual Control CHEAL | Percent (%) Visual Control POLCO |
|---|---|---|---|---|---|
| 1 | 1.0 | B12-B16 | 6.3 | 35 | 5 |
| 2 | 2.0 | B12-B16 | 7.5 | 98 | 22.5 |
| 3 | 3.0 | B12-B16 | 12.5 | 95.8 | 60 |
| 4 | 0.5 | B10-B12 | 3.8 | 30 | 20 |
|   | 0.5 | B12-B16 |     |    |    |
| 5 | 1.0 | B10-B12 | 8.8 | 96.8 | 35 |
|   | 1.0 | B12-B16 |     |    |    |
| untreated |  |  | 7.5 | 0 | 0 |

BEAVA refers to sugar beet (*Beta vulgaris* subsp. *vulgaris* var. *altissima*)
CHEAL refers to common lambsquarters (*Chenopodium album* L.)
POLCO refers to wild buckwheat (*Polygonum convolvulus* L.)

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A method for the selective post-emergent control of undesirable vegetation in the presence of a crop selected from the group consisting of sunflowers, sorghum, yellow mustard, spring kale, spring turnip, spring rutabaga, and spring Winfred forage *brassica*, which comprises applying a herbicidally effective amount of 4-amino-3-chloro-6-(4-chloro-2-fluoro-3-methoxyphenyl)pyridine-2-carboxylic acid or an agriculturally acceptable ester or salt thereof directly to the undesirable vegetation or to the locus thereof or to the area where control of the undesirable vegetation is desired,
wherein the 4-amino-3-chloro-6-(4-chloro-2-fluoro-3-methoxyphenyl)pyridine-2-carboxylic acid or agriculturally acceptable ester or salt thereof is applied at a rate of up to 10 g ae/ha,
wherein the 4-amino-3-chloro-6-(4-chloro-2-fluoro-3-methoxyphenyl)pyridine-2-carboxylic acid or an agriculturally acceptable ester or salt thereof is not combined with aminopyralid,
wherein the degree of injury to the crop is less than 20% rated visually, and
wherein the undesirable vegetation is selected from a group consisting of *Amaranthus* spp., *Fumaria* spp., *Conyza* spp., *Geranium* spp., *Ambrosia* spp., *Malva* spp., *Lamium* spp., cleavers (*Galium aparine*), chickweed (*Stellaria media*), hempnettle (*Galeopsis tetrahit*), lamb's-quarters (*Chenopodium album*), Mexican pricklepoppy (*Argemone mexicana*), stork's-bill (*Erodium cicutarium*), volunteer flax (*Linum usitatissimum*), and volunteer alfalfa (*Medicago sativa*).

2. The method of claim 1, wherein said 4-amino-3-chloro-6-(4-chloro-2-fluoro-3-methoxyphenyl)pyridine-2-carboxylic acid or agriculturally acceptable ester or salt thereof is applied at a rate of up to 5 g ae/ha.

3. The method of claim 1, wherein said 4-amino-3-chloro-6-(4-chloro-2-fluoro-3-methoxyphenyl)pyridine-2-carboxylic acid or agriculturally acceptable ester or salt thereof is applied at a rate of up to 2.5 g ae/ha.

4. The method of claim 1, wherein the crop is sunflowers.

5. The method of claim 1, wherein the crop is *sorghum*.

6. The method of claim 1, wherein the crop is yellow mustard.

7. The method of claim 1, wherein the crop is spring kale.

8. The method of claim 1, wherein the crop is spring turnip.

9. The method of claim 1, wherein the crop is spring rutabaga.

10. The method of claim 1, wherein the crop is spring Winfred forage *brassica*.

11. The method of claim 1, wherein the degree of control of the undesirable vegetation is at least 80% rated visually.

12. A method for the selective post-emergent control of undesirable vegetation, comprising applying a herbicide or herbicidal composition comprising 4-amino-3-chloro-6-(4-chloro-2-fluoro-3-methoxyphenyl)pyridine-2-carboxylic acid or an agriculturally acceptable ester or salt thereof at an application rate from 2.5 to 10 g ae/ha to a crop selected from the group consisting of sunflowers, *sorghum*, yellow mustard, spring kale, spring turnip, spring rutabaga, and spring Winfred forage *brassica*,
wherein the herbicide or herbicidal composition is applied directed to the undesirable vegetation or to the locus thereof or to the area where control of the undesirable vegetation is desired,
wherein the herbicide or herbicidal composition does not comprise aminopyralid,
wherein the degree of injury to the crop is less than or equal to 20% rated visually, and
wherein the undesirable vegetation is selected from a group consisting of *Amaranthus* spp., *Fumaria* spp., *Conyza* spp., *Geranium* spp., *Ambrosia* spp., *Malva* spp., *Lamium* spp., cleavers (*Galium aparine*), chickweed (*Stellaria media*), hempnettle (*Galeopsis tetrahit*), lamb's-quarters (*Chenopodium album*), Mexican pricklepoppy (*Argemone mexicana*), stork's-bill (*Erodium cicutarium*), volunteer flax (*Linum usitatissimum*), and volunteer alfalfa (*Medicago sativa*).

\* \* \* \* \*